United States Patent [19]

Kondou

[11] Patent Number: 4,888,183

[45] Date of Patent: Dec. 19, 1989

[54] FERMENTED MILK

[75] Inventor: Tsutomu Kondou, Sagamihara, Japan

[73] Assignees: Mitsubishi Kasei Corporation; Nikken Chemicals Company, Limited, both of Japan

[21] Appl. No.: 223,893

[22] Filed: Jul. 25, 1988

[30] Foreign Application Priority Data

Jul. 28, 1987 [JP] Japan .................................. 65-188485

[51] Int. Cl.$^4$ ........................ A23C 9/13; A23L 1/236; A23L 1/20
[52] U.S. Cl. ........................................ 426/34; 426/43; 426/46; 426/51; 426/61; 426/580; 426/583; 426/590; 426/598; 426/629; 426/548
[58] Field of Search ................... 426/34, 40, 49, 51, 426/55, 629, 61, 43, 46, 580, 548, 583, 590, 598

[56] References Cited

U.S. PATENT DOCUMENTS

| | | | |
|---|---|---|---|
| 3,876,794 | 4/1975 | Rennhard | 426/548 |
| 4,430,349 | 2/1984 | Malone et al. | 426/34 |
| 4,770,889 | 9/1988 | Sakai et al. | 426/548 |

Primary Examiner—Marianne Cintins
Attorney, Agent, or Firm—Jordan B. Bierman, Bierman and Muserlian

[57] ABSTRACT

A fermented milk comprising 10 to 20% by weight of mesoerythritol is disclosed. This fermented milk shows scarcely any change in pH value and maintains a refreshing and desirable sweetness upon storage at a high temperature, e.g., 15° C. for a week.

4 Claims, No Drawings

FERMENTED MILK

FIELD OF THE INVENTION

This invention relates to a fermented milk.

BACKGROUND OF THE INVENTION

Conventional fermented milks such as yoghurt or various lactic acid beverages are prepared by adding, for example, sugar, isomerized sugar or glucose to milk, skim milk powder or whey optionally together with a shape retaining agent such as gelatin or a paste such as agar.

A fermented milk is prepared by inoculating a pasteurized yoghurt mix with a starter, which is a mixture of lactic acid bacteria, for example, mixture of *Lactobacillus bulgaricus* and *Streptococcus thermophillus*, effecting lactic fermentation at a definite temperature for a definite period of time until the aimed pH value is achieved and then cooling the fermented mixture to thereby cease the fermentation. The fermented milk products thus obtained are put into refrigerated storage and distributed as such. However these products are frequently stored at a temperature of 10° to 15° C. or higher during the distribution. Then the lactic fermentation further proceeds with the lapse of time, which lowers the pH value of the product and elevates the sourness thereof. For example, when a fermented milk showing a pH value of 4.2 immediately after the preparation is stored at a temperature of 10° to 15° C. for one week, the pH value thereof falls to 3.98 to 3.91. Thus the product becomes extremely sour, which considerably lowers the preference thereof.

SUMMARY OF THE INVENTION

According to the present invention there is to provide a fermented milk comprising 10 to 20% by weight of mesoerythritol.

DETAILED DESCRIPTION OF THE INVENTION

Erythritol, which is a sugar alcohol of a tetrose, is present in three forms, namely, D-, L-, and meso-forms. Neither D-erythritol nor L-erythritol occurs in nature. On the other hand, mesoerythritol is contained in, for example, natural materials such as algae and fungi as well as sake, wine and soy sauce. Mesoerythritol is a sugar alcohol of a tetrose having the following formula.

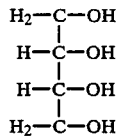

It has a molecular weight of 122 and a melting point of 126° C. and is present in the form of white crystals readily soluble in water. It is nondigestable and noncaries and shows no browning property.

The sweetness of mesoerythritol is 15, while that of sucrose is approximately 11.5. Since mesoerythritol is scarcely digested, it is suitable as a sweetner for those suffering diabetic diseases or for inhibiting obesity.

Examples of the fermented milk as described herein include yoghurt and various lactic acid beverages as well as fermented soybean milk obtained through lactic fermentation of soybean milk. Further various food products, which are obtained through lactic fermentation of material wherein some or all sweetners are nonsugar ones, may be available. Furthermore the present invention may be applied to a lactic fermented food product, which is prepared from material containing natural sweetner, to thereby suppress a decrease in the pH value of the product, depending on the content of said sweetner.

The lactic fermentation may be carried out in a conventional manner. An example thereof is as follows.

A mix is prepared by adding, for example, water and a flavor to milk or skim milk powder and adjusting the pH value of the resulting mixture to a definite level. Then 1 to 5% by weight of a mixture of *Lactobacillus bulgaricus* and *Streptococcus thermophillus* is added thereto as a starter. Thus the fermentation is effected at a temperature of 35° to 45° C. for 4 to 20 hours to thereby give a fermented milk of a pH value of 4.0 to 4.5. The obtained fermented milk is cooled to give a fermented milk product.

In the present invention, mesoerythritol may be added to the fermented milk either immediately after the completion of the fermentation or after cooling.

Examples of species of Lactobacillus and Streptococcus according to the present invention are *Lactobacillus bulgaricus, helveticus, jugurti, lactis,* or *acidophilus*; and *Streptococcus thermophilus, cemorris, lactis,* or *diacetilatis.*

The mesoerythritol to be added may be either in the form of a powder or a solution.

Mesoerythritol is nonfermentable, though it is a sweetner occuring in nature and having an excellent sweetness and has a smaller molecular weight in one third of sucrose. Thus the addition of the same to the fermented milk, as described above, would suppress the excessive fermentation with the starter to thereby inhibit the formation of the excessive acid. Therefore the fermented milk product can maintain the pH value achieved immediately after the fermentation.

A lactic acid bacterium grows by utilizing lactose present in milk or skim milk powder as a nutrient, i.e., as a carbon source. When a sugar is added thereto, the osmotic pressure of the sugar would inhibit the activity, namely, the acid-productivity of the lactic acid bacterium. Since erythritol has a smaller molecular weight in one third of sucrose, the osmotic pressure of the former is approximately three times as high as that of the latter. Thus it is believed that erythritol can more effectively inhibit the acid production by a lactic acid bacterium than sucrose does.

The fermented milk of the present invention comprising 10 to 20% of mesoerythritol showed scarcely any decrease in pH value nor any change in sweetness but a refreshing sweetness, after storing under conditions frequently observed during the distribution, namely, at a temperature as high as 15° C. for a week.

To further illustrate the present invention, and not by way of limitation, the following Examples will be given.

Unless otherwise indicated, all parts, percents and ratios are by weight.

EXAMPLES 1 TO 3 AND COMPARATIVE EXAMPLES 1 TO 6

50 g of milk, 8 g of skim milk powder and 42 g of water were mixed together and the obtained mixture was pasteurized at 80° C. for ten minutes. Separately, a lyophilized mixture of *Lactobacillus bulgaricus* and *Streptococcus thermophillus* obtained from Japan Dairy Products Association was subcultured over two generations to thereby give a solution of the lactic acid bacteria having a solid content of 10%. Then the pasteurized milk as obtained above was inoculated with 2 ml of the bacterial solution and maintained in a thermostat at 45° C. When the pH value of the culture reached 4.2, it was, immediately cooled and mesoerythritol (mfd. by Nikken Chemicals Co., Ltd.: micropowder) or sucrose, each in the amount as specified in Table 1, was added thereto. Each mixture thus obtained was thoroughly stirred, packed in a container and stored at the temperature as specified in Table 1 for a week. Then the pH value of each sample was determined. Table 1 shows the results.

According to the standard on milk and dairy product specified by The Ministry of Health and Welfare, it is recommended that a fermented milk product contains $10^8$ cells/ml or above of lactic acid bacteria. Every sample as obtained above satisfied this requirement.

TABLE 1

| Example | Added sweetener | | Storage Temp. and pH | | | |
|---|---|---|---|---|---|---|
| | | | start | 5° C. | 10° C. | 15° C. |
| C. Ex. 1 | | 0 | 4.20 | 4.08 | 3.98 | 3.91 |
| C. Ex. 2 | mesoerythritol | 5 | 4.20 | 4.09 | 4.01 | 3.94 |
| Ex. 1 | mesoerythritol | 10 | 4.20 | 4.11 | 4.06 | 4.00 |
| Ex. 2 | mesoerythritol | 13 | 4.20 | 4.14 | 4.09 | 4.04 |
| Ex. 3 | mesoerythritol | 15 | 4.20 | 4.16 | 4.12 | 4.07 |
| Ex. 4 | mesoerythritol | 20 | 4.20 | 4.19 | 4.19 | 4.14 |
| C. Ex. 3 | sucrose | 5 | 4.20 | 4.06 | 3.97 | 3.90 |
| C. Ex. 4 | sucrose | 10 | 4.19 | 4.07 | 3.98 | 3.91 |
| C. Ex. 5 | sucrose | 15 | 4.19 | 4.07 | 3.99 | 3.94 |
| C. Ex. 6 | sucrose | 20 | 4.18 | 4.08 | 4.02 | 3.96 |

A commercially available fermented milk contains approximately 10% of sucrose as a sweetner, which corresponds to approximately 13% of mesoerythritol.

Therefore the fermented milk comprising 10% of sucrose and that comprising 13% of mesoerythritol, according to the present invention, each shown in Table 1 were organoleptically evaluated immediately after the completion of the fermentation and after storing at 15° C. for a week.

Five persons engaged in studies on food production in Research Institute of Mitsubishi Chemical Industries, Ltd were employed as panelists in the test.

Each panelist indicated that these samples showed scarcely any difference in the degree of the sweetness immediately after the completion of the fermentation and that the sample of the present invention had a refreshing sweetness.

After storing at 15° C. for a week, the sample of the present invention comprising mesoerythritol showed a refreshing sweetness and a desirable sourness. In contrast thereto, the comparative sample containing no sugar, that comprising 5% of mesoerythritol and that comprising sucrose showed each an insufficient sweetness and an excessive sourness.

While the invention has been described in detail and with reference to specific embodiments thereof, it will be apparent to one skilled in the art that various changes and modifications can be made therein without departing from the spirit and scope thereof.

What is claimed is:

1. A fermented milk comprising 10 to 20% by weight of mesoerythritol.

2. The fermented milk according to claim 1, wherein said fermented milk is yoghurt, lactic acid beverages or fermented soybean milk.

3. A method of controlling the pH of fermented milk comprising incorporating into said milk 10% to 20% by weight of mesoerythritol.

4. The method of claim 3 wherein said milk is yoghurt, lactic acid beverages, or fermented soybean milk.

* * * * *

UNITED STATES PATENT AND TRADEMARK OFFICE
CERTIFICATE OF CORRECTION

PATENT NO. : 4,888,183
DATED : December 19, 1989
INVENTOR(S) : KONDOU It is certified that error appears in the above-identified patent and that said Letters Patent is hereby corrected as shown below:

Title page:

Item 30, correct to --July 28, 1987 [JP] Japan.............62-188485--

Signed and Sealed this

Tenth Day of July, 1990

*Attest:*

HARRY F. MANBECK, JR.

*Attesting Officer*   Commissioner of Patents and Trademarks